United States Patent [19]
Hopkins et al.

[11] Patent Number: 5,478,243
[45] Date of Patent: Dec. 26, 1995

[54] AUTOMOTIVE ELECTRICAL WIRING CONNECTOR AND METHOD OF INSTALLING SAME THROUGH SMALL OPENINGS

[75] Inventors: Evan L. Hopkins; E. Leon Hopkins, both of Emporia, Kans.

[73] Assignee: Hopkins Manufacturing Corporation, Emporia, Kans.

[21] Appl. No.: 238,890

[22] Filed: May 6, 1994

[51] Int. Cl.⁶ .................................................. H01R 13/514
[52] U.S. Cl. .............................. 439/35; 439/586; 439/597
[58] Field of Search ............................... 439/35, 586, 597, 439/502, 170

[56] References Cited

U.S. PATENT DOCUMENTS

| | | |
|---|---|---|
| 3,344,392 | 9/1967 | Briscoe ................................. 439/502 X |
| 3,399,373 | 8/1968 | Maki et al. . |
| 4,017,141 | 4/1977 | Bury et al. . |
| 4,057,310 | 11/1977 | Young ................................. 439/35 OR |
| 4,626,054 | 12/1986 | Tengler et al. . |
| 4,629,279 | 12/1986 | Nishikawa . |
| 5,184,960 | 2/1993 | Hopkins et al. . |
| 5,281,147 | 1/1994 | Hughes ............................... 439/35 OR |

*Primary Examiner*—Neil Abrams
*Assistant Examiner*—Daniel Wittels
*Attorney, Agent, or Firm*—Hovey, Williams, Timmons & Collins

[57] ABSTRACT

An automotive electrical wiring harness for connecting the electrical system of a towing vehicle to that of a trailer or the like has a flat connector at one end which is foldable along a hinge line of weakness in the body of the connector. When folded, the connector body is smaller than the diameter of a small opening in the bumper of the towing vehicle so as to permit the connector to be passed through the opening while the rest of the harness stays behind. Once on the far side of the opening, the connector is unfolded to reestablish its original flat, full size configuration, whereupon it may be coupled with other connector components of the vehicle's electrical system. Optionally, a protective sleeve may be slipped over the connector and frictionally retained in place thereon once the connector has been passed through the opening, so as to maintain structural integrity of the connection and to guard against the ingress of moisture and contaminants. Additionally, a storage container may be mounted on the rear face of the bumper in overlying relationship to the installation opening for neatly housing the remaining parts of the harness during periods of nonuse.

18 Claims, 4 Drawing Sheets

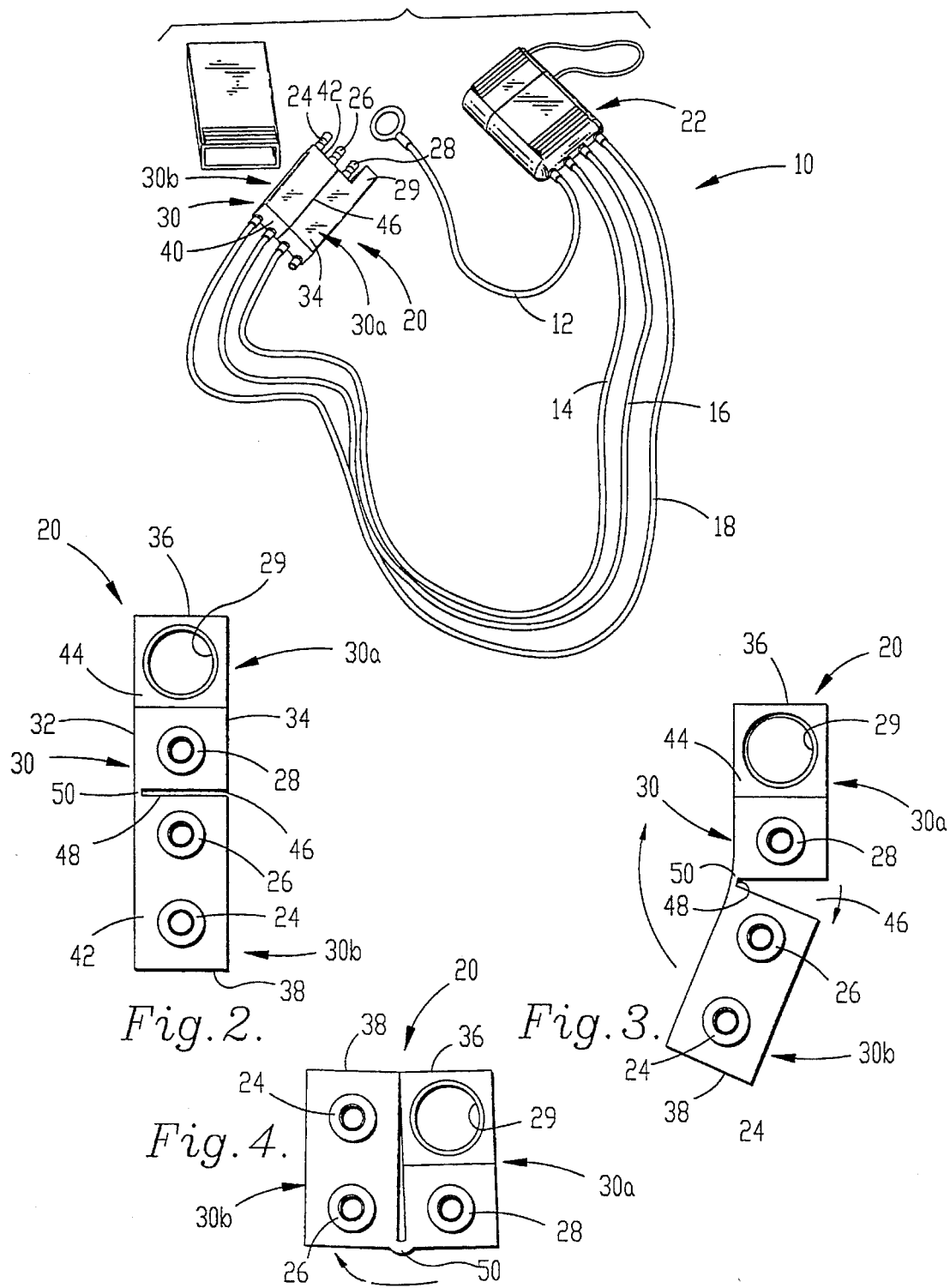

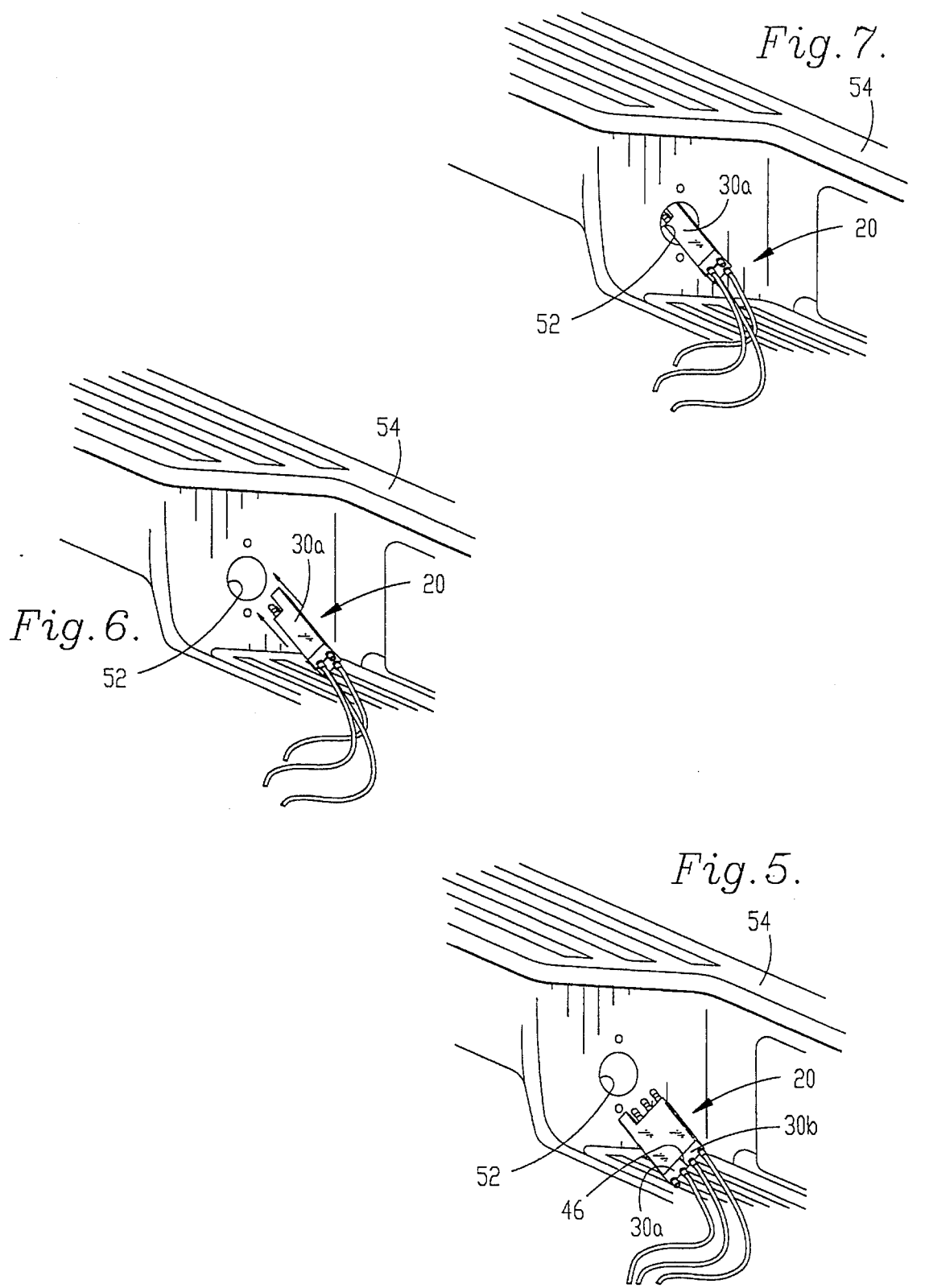

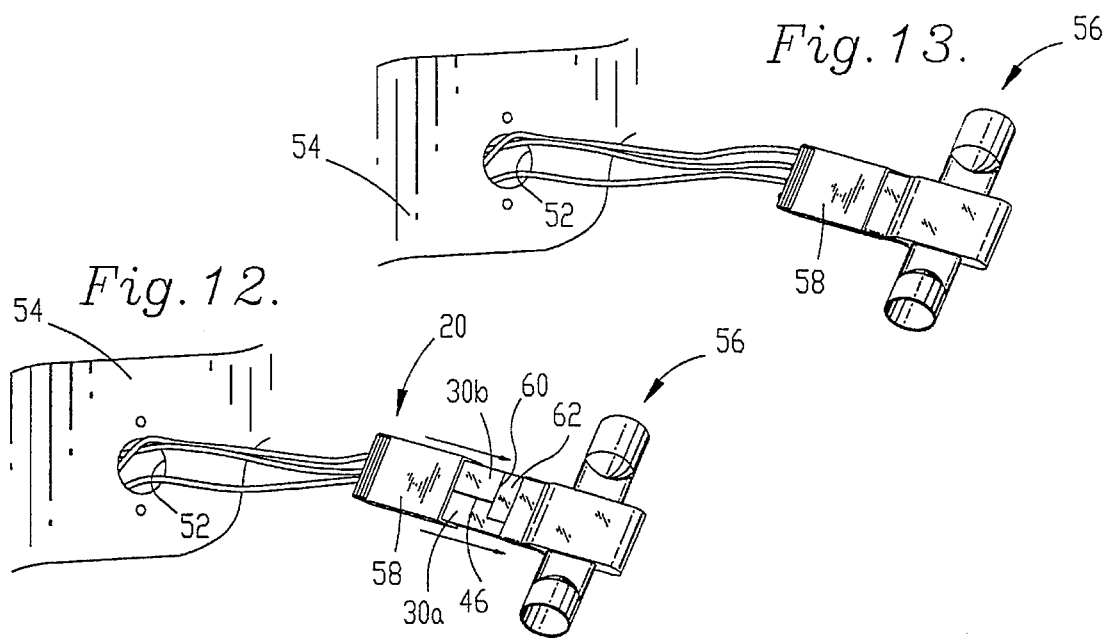
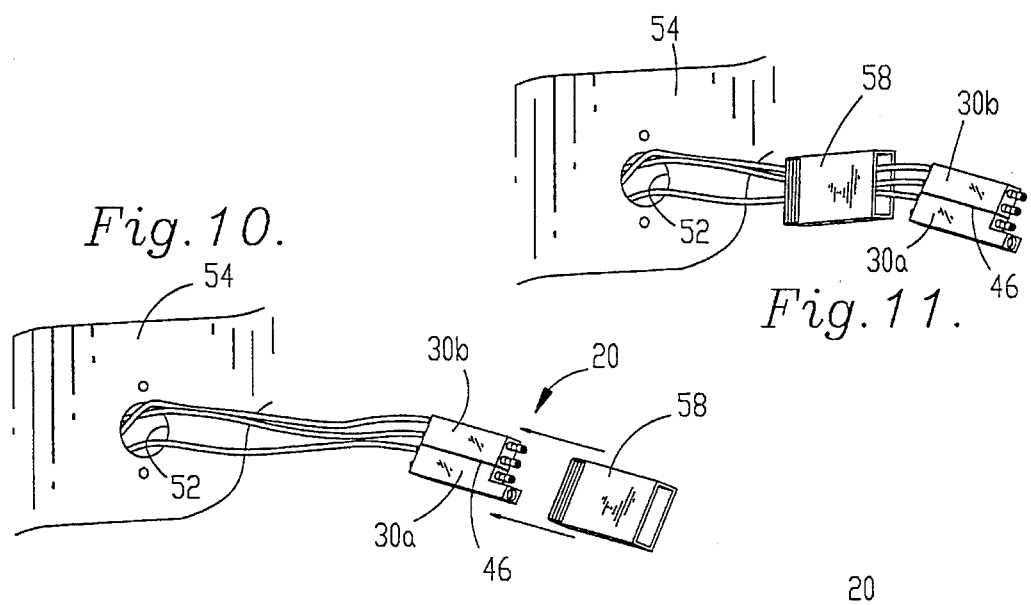
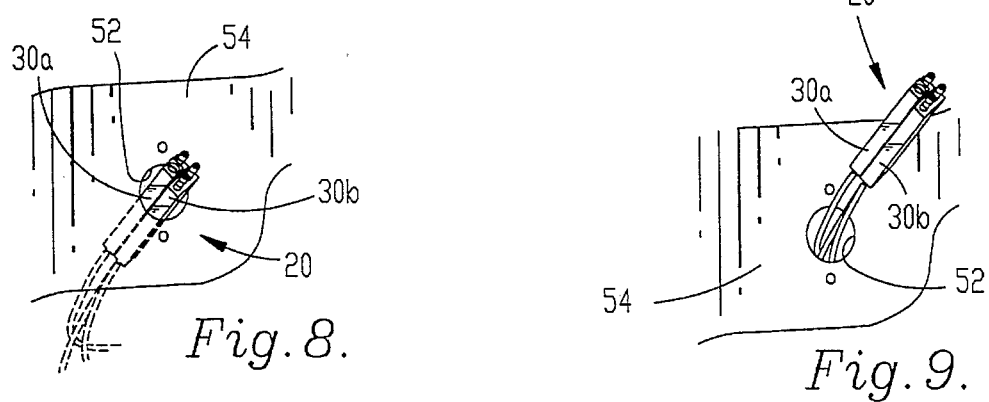

AUTOMOTIVE ELECTRICAL WIRING CONNECTOR AND METHOD OF INSTALLING SAME THROUGH SMALL OPENINGS

TECHNICAL FIELD

The present invention relates to automotive electrical wiring harnesses and, more particularly, to a harness especially designed for connecting the electrical system of a towing vehicle to that of a trailer or other towed vehicle and which is conveniently installable through a small opening typically found in the rear bumper of most pickup trucks.

BACKGROUND

In order to establish electrical continuity between the brake, taillight and turn signal system of a towing vehicle and that of the towed vehicle it is necessary to install a relatively short wiring harness adjacent the rear bumper of the towing vehicle that makes the two systems compatible with one another and facilitates hook up. Typically, the harness is installed as an after-market item and is left on the towing vehicle permanently so that the vehicle is always electrically ready for hooking up to the trailer.

Since the wiring harness is permanently installed on the towing vehicle, it is desirable to have a neat, orderly installation which avoids loose, dangling wires which are not only unsightly but which can also snag on obstacles passing beneath the vehicle and can become contaminated with moisture, grit and grime. One way to encourage a clean, professional-looking installation is to take advantage of a small opening typically found in most truck bumpers in the vicinity of the ball hitch and license plate mounting bracket, such opening serving as an orifice through which the harness can be neatly threaded and thus held up out of the obstacles and contaminants below the vehicle.

However, such openings are typically smaller in diameter than the rubberized connectors at opposite ends of the harness. Thus, unless the opening is enlarged at the time of installing the harness, the opening cannot be used. This would necessitate drilling out the opening which not only increases installation time and necessitates more tools, but also may not be appreciated by the owner of the vehicle.

SUMMARY OF THE PRESENT INVENTION

Accordingly, one important object of the present invention is to provide an automotive wiring harness having a connector at one end of typical dimensions and which can be temporarily folded or otherwise rearranged to reduce its width adequately to permit it to be inserted through a small opening in the bumper. Once the connector is through the opening and on the far side of the bumper, it is unfolded to its original, full dimensional configuration for coupling with the electrical system of the vehicle. A protective sleeve may be slipped onto the connector once it is passed through the bumper so as to securely retain the connector in its full size condition and to guard against the entry of moisture and other contaminants. A small storage box may be secured to the outside face of the bumper in overlying relationship to the installation opening so as to neatly receive and retain the remaining portion of the harness assembly, including the connector at the opposite end thereof, such box having a hole in one of its walls which is aligned with the installation opening of the bumper when the box is installed thereon such that, during the installation procedure, the reduced dimension connector is inserted both through the hole in the box and the opening in the bumper. Preferably, but not necessarily, the reducible dimension connector is provided with its ability to become more compact by virtue of a narrow, longitudinal slot extending partially through the body of the connector and leaving a thin web of resilient material at the bottom of the slot which presents a living hinge for folding of the two body sections into a compacted, superimposed position.

BRIEF DESCRIPTION OF THE DRAWINGS

FIG. 1 is an isometric view of a wiring harness constructed in accordance with the principles of the present invention;

FIG. 2 is an enlarged end view of the foldable connector of the harness with the connector illustrated in its full size, unfolded condition;

FIG. 3 is an enlarged elevational view of the connector similar to FIG. 2 but showing the connector partially folded;

FIG. 4 is an enlarged end view of the connector in its folded configuration;

FIG. 5 is a fragmentary perspective view of the rear bumper of a truck or other vehicle upon which the harness is to be installed, illustrating a small opening in the bumper through which the connector is desirably installed;

FIG. 6 is a similar perspective view of the bumper showing the connector folded into its compacted condition for insertion into the opening;

FIG. 7 is a similar perspective view of the bumper showing the folded connector passing through the opening;

FIG. 8 is a perspective view of the bumper from the opposite side thereof showing the folded connector coming through the opening;

FIG. 9 is a perspective view of the inside of the bumper showing the folded connector completely through the opening;

FIG. 10 is a perspective view of the inside of the bumper showing the connector returned to its unfolded condition with a protective sleeve about to be slipped onto the body of the connector;

FIG. 11 is a perspective view of the bumper illustrating the sleeve completely onto the harness and temporarily retained by the conductors of the harness;

FIG. 12 is a perspective view of the inside of the bumper showing the connector coupled with another connector device associated with the wiring system of the vehicle, the protective sleeve being partially slipped back onto the connector;

FIG. 13 is a perspective view of the inside of the bumper showing the sleeve fully slipped up into overlapping relationship with the connector and the proximal portion of the other device so that the joint between the two components is fully covered by the sleeve;

DETAILED DESCRIPTION

Figure 14:
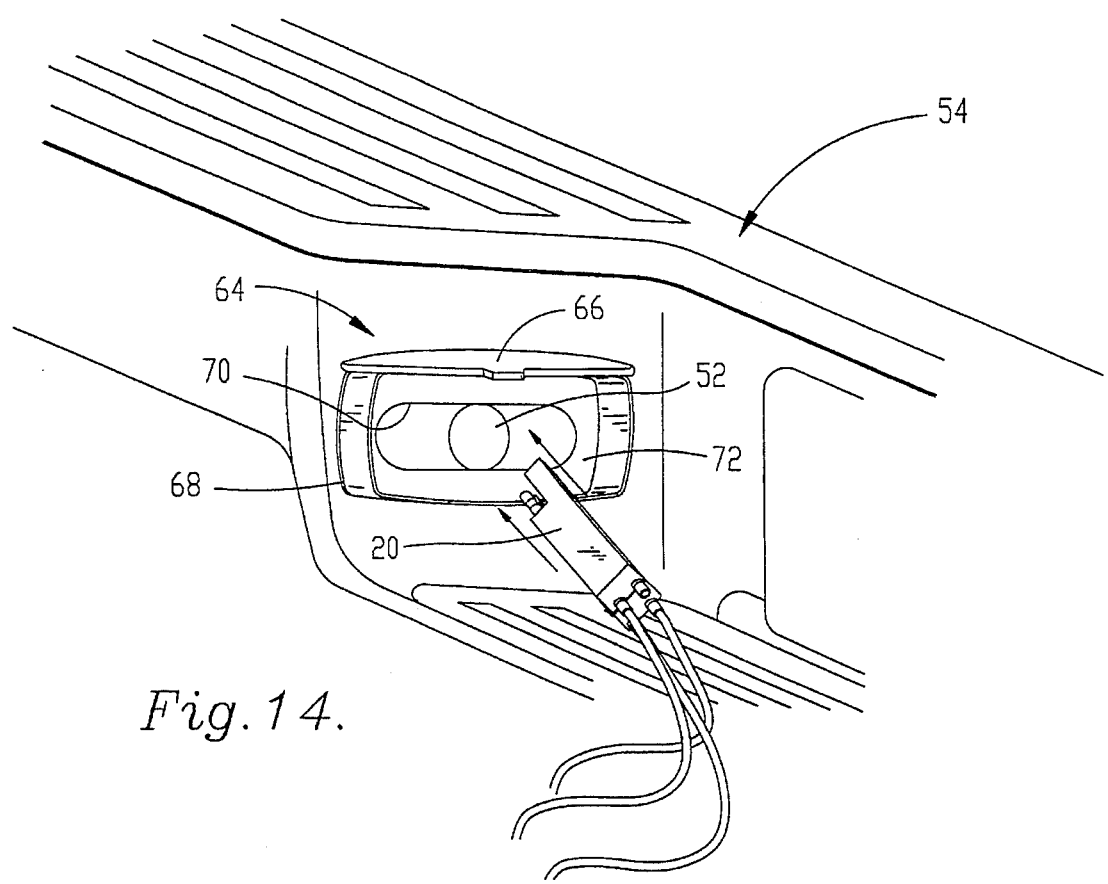
FIG. 14 is a perspective view of the outside of the bumper illustrating how a protective container may be attached to the bumper with a hole in the back wall of the container aligned with the opening of the bumper to facilitate easy installation of the harness.

The wiring harness 10 in FIG. 1 includes a plurality of elongated, flexible electrical conductors 12, 14, 16 and 18 arranged in generally side-by-side relationship. In one form of the invention the conductor 12 comprises an insulated grounding wire while the other conductors 14, 16 and 18 comprise insulated wires for conveying electrical signals along the harness 12 between the towing and towed vehicles. Also in its preferred form the harness 10 includes a pair of flat connectors 20 and 22 at opposite ends of the harness, each of the connectors 20, 22 having embedded therewithin connection means in the nature of a plurality of male and/or female connection elements that are electrically coupled with the conductors 12–18 in a desired manner. As illustrated by the connector 20 in FIGS. 1 and 2, for example, the connection means may comprise three male connection elements 24, 26 and 28 and one female receiving socket element 29, all of which is well known by those skilled in the art.

The connector 20 has a flat, rectangular body broadly denoted by the numeral 30. Preferably, the body 30 is constructed from a synthetic resinous material capable of electrically insulating the connection elements 24–29 from one another, such elements 24–29 being advantageously embedded within the body 30 during a molding process. The body 30 has a pair of opposite flat sides 32 and 34 as shown in FIGS. 1 and 2, for example, a pair of flat edges 36 and 38, a flat end 40 from which the conductors 14–18 extend, and a generally flat but stepped connecting end 42 from which the elements 24–29 project. The female element 29 is surrounded by a block-like step 44 on end 42.

In accordance with the present invention, the body 30 has a longitudinal slot 46 which extends the full length of the body. The slot 46 commences at side 34 of the body 30 and extends transversely through the body almost to the opposite side 32, stopping at a termination 48. The presence of the termination 48 in close proximity to the side 32 causes the formation of a relatively thin web of material 50 at the bottom of the slot 46 which serves as a living hinge when the body 30 is constructed from a suitable resinous material such as 50–60 durometer polyvinyl chloride. Preferably, the slot 46 is located symmetrically between the two edges 36, 38 so that the female socket 29 and one of the male elements 28 are disposed on one side of the hinge 50 while the remaining two male elements 24, 26 are disposed on the opposite side of the hinge 50. Consequently, the hinge 50 may be seen as being integrally connected between two foldable parts 30a and 30b of the body 30 of substantially similar dimensions, permitting the parts 30a and 30b to be compactly superimposed on top of one another when the body 30 is completely folded as shown in FIG. 4, for example. It will be seen that the overall width of the connector 20 is substantially reduced when it is in the folded condition of FIG. 4.

FIGS. 5–15 illustrate a method of installing the harness 10 in accordance with the principles of the present invention. As illustrated in FIG. 5, the connector 20 is initially full size and is thus too wide to pass through a small opening 52 in the rear bumper 54 or other structural member associated with the towing vehicle. By then folding the connector 20 about hinge 50 until the body parts 30a and 30b are placed in superimposed relationship with one another as shown in FIG. 6, the overall width of the connector 20 is sufficiently reduced as to be less than the diameter of the opening 52, permitting the folded connector 20 to thereupon be inserted lengthwise into the opening 52 as illustrated in FIG. 7. This is also illustrated in FIG. 8 wherein the inside of the bumper 54 is illustrated and the folded connector 20 is shown part way through the opening 52.

The folded connector 20 is pushed on through the opening 52 until the condition of FIG. 9 is obtained, whereupon the connector 20 is unfolded to its full size as illustrated in FIG. 10. At this time, the connector 20 may be coupled with a Tee connector device 56, if desired, as shown in FIGS. 12 and 13. Optionally, before coupling the connector 20 with the Tee connector 56, the connector 20 may be provided with a protective sleeve 58 as illustrated in FIG. 10, such sleeve 58 having an internal configuration matching the external shape of the flat connector 20 such that the sleeve 58 may be slipped axially onto the connector 20 as illustrated in FIGS. 10 and 11. It may be most convenient to slide the sleeve 58 completely on past the connector 20 and onto the conductors 14–18 as illustrated in FIG. 11, until such time as the connectors 20 and 56 have been joined together. Once such junction is established as shown in FIG. 12, the sleeve 58 may then be slid back onto the connector 20 as shown in FIG. 12. As also shown in FIG. 12, the junction line 60 between the connector 20 and the Tee connector 56 is exposed as the sleeve 58 is in the process of being returned back onto the connector 20. However, as shown in FIG. 13, once the sleeve 58 is fully in place, such sleeve 58 overlaps the junction line 60 to prevent the ingress of moisture and contaminants. The sleeve 58 also overlaps and covers a proximal portion 62 of the Tee connector 56 which abuts the connecting end 42 of connector 20 and is the same width as the connector 20. Preferably, the inside dimensions of the sleeve 58 are close to the outside dimensions of the connector 20 such that the sleeve 58 has a frictional sliding fit with the connector 20 and is frictionally retained on the connector 20.

It will be appreciated that in its preferred form the body 30 of the folding connector 20 comprises an integrally molded component such that the two parts 30a and 30b, as well as the hinge web 50, are all integrally joined together. However, such integral construction is not mandatory. Furthermore, it is possible that the reduced effective dimensions of the connector 20 for insertion through the small opening 52 may be achieved by other means than a hinge 50 that foldably interconnects two parts of the connector. For example, the two parts could be completely separate on one side of the opening 52 and then brought together within a confining sleeve such as the sleeve 58 on the opposite side of the opening 52.

Figure 15:
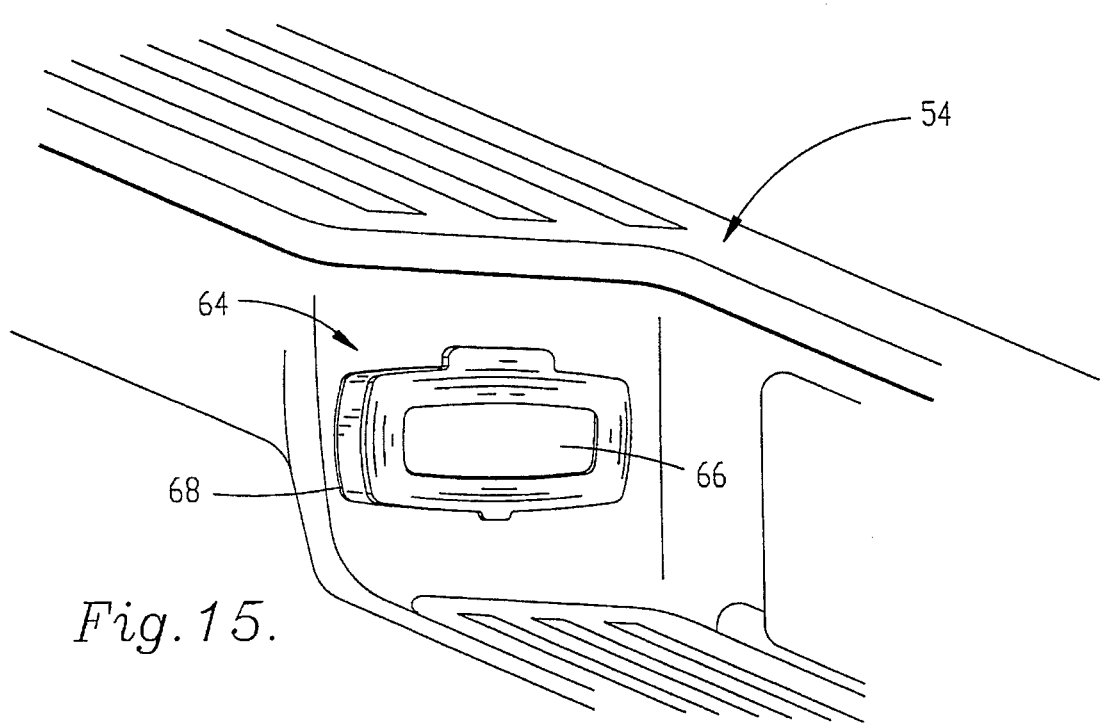
FIG. 15 is a perspective view of the container after the installation is fully complete and loose wires are conveniently stored within the container with its lid closed.

Furthermore, if desired, a suitable container such as the container 64 in FIGS. 14 and 15 may be attached to the bumper 54 to provide a convenient, visually pleasing means of storing the connector 22 and its associated lengths of the conductors 12–18. Such container 64 preferably has a spring loaded lid 66 which is biased into a closed position as illustrated in FIG. 15 to keep out moisture, grit and grime.

If the container 64 is used, it may be conveniently provided with an adhesive backing 68 by which the container 64 may be attached to the flat surface of the bumper 54 surrounding the opening 52. A hole 70 in the back wall 72 of the container 64 is aligned with the opening 52 so that the harness 10 may be threaded through the hole 70 as well as the opening 52. If the hole 70 is generally of the same size as the opening 52, then it will be necessary to attach the container 64 onto the bumper 54 before the connector 20 is folded and inserted through the bumper. Otherwise, the only way to pass the harness 10 through the hole 70 is by passing the connector 22 through it as well, and such connector 22 may be too large to pass through such hole.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby state their intent to rely on the Doctrine of Equivalents to determine and assess the reasonably fair scope of their invention as pertains to any apparatus not materially departing from but outside the literal scope of the invention as set out in the following claims.

We claim:

1. An automotive electrical wiring harness adapted for insertion through small openings in automotive bumpers and the like comprising:

a plurality of elongated, flexible electrical conductors arranged in side-by-side relationship;

connection means adjacent at least one end of the conductors; and a pair of electrically insulating parts each having a connection means received therein, said parts being disposed for selective placement in either a full-size, operating configuration in which the parts are disposed for coupling with another device or a reduced dimension, installing configuration in which the parts are disposed for insertion through the small opening.

2. An automotive electrical wiring harness as claimed in claim 1, said parts having a hinge swingably coupling the parts with one another for relative swinging movement of the parts between said full-size configuration and said reduced dimension configuration.

3. An automotive electrical wiring harness as claimed in claim 2, said parts being disposed in a folded condition in mutually superimposed relationship when in said reduced dimension configuration and being disposed in an unfolded condition generally beside one another when in said full-size configuration.

4. An automotive electrical wiring harness as claimed in claim 3, said parts and said hinge being integrally joined together in a unitary body, said hinge comprising a flexible web of material extending between the two parts of the body.

5. An automotive electrical wiring harness as claimed in claim 4, said body having a pair of opposite, at least generally flat sides and a slot extending from one of said sides partially through the body to a termination near the opposite side, said web being disposed at said termination of the slot.

6. An automotive electrical wiring harness as claimed in claim 5, said body being molded around said connection means, said slot being formed in the body during said molding of the latter.

7. An automotive electrical wiring harness as claimed in claim 6; and a sleeve slidably received on the body when the parts are in the unfolded condition for retaining the parts in said unfolded condition.

8. An automotive electrical wiring harness as claimed in claim 1; and a sleeve slidably received around the parts when the parts are in said operating configuration for retaining the bodies in said operating configuration.

9. A method of installing an automotive electrical wiring harness on a vehicle having an opening that is smaller in diameter than the overall width of a connector at one end of the harness when a pair of body portions of the connector are in their normal, side-by-side position, said method comprising the steps of:

placing the body portions of the connector in such a position relative to one another on one side of the opening as to reduce the effective width of the connector to a dimension less than the diameter of the opening;

inserting the connector through the opening while the connector is reduced in width;

returning the body portions of the connector to their normal side-by-side position on the far side of the opening after the connector has been passed completely through the opening; and joining the connector with another device while the connector is on the far side of the opening and the body portions of the connector are in their normal position.

10. A method of installing an automotive electrical wiring harness as claimed in claim 9, said placing step including the step of folding the connector to reduce the effective width thereof.

11. A method of installing an automotive electrical wiring harness as claimed in claim 10, said returning step including the step of unfolding the connector to reestablish the original width of the connector.

12. A method of installing an automotive electrical wiring harness as claimed in claim 11, said joining step including the step of coupling the connector with another device having a proximal portion which is at least substantially the same width as the connector; and positioning a sleeve around the connector and said proximal portion of said another device.

13. A method of installing an automotive electrical wiring harness as claimed in claim 12, said positioning step including sliding the sleeve into place on the connector and said proximal portion of said another device and frictionally retaining the sleeve in place.

14. A method of installing an automotive electrical wiring harness as claimed in claim 10, said body portions being interconnected by a web of material presenting a hinge line of weakness, said folding of the connector being carried out along said hinge line of weakness.

15. A method of installing an automotive electrical wiring harness as claimed in claim 14; and before said joining step, unfolding the connector and inserting the unfolded connector into a sleeve.

16. A method of installing an automotive electrical wiring harness as claimed in claim 15, said step of inserting the unfolded connector into a sleeve including the step of passing the connector completely through the sleeve and temporarily retaining the sleeve on conductors extending from the connector, said sleeve being returned onto the connector after said joining step is carried out.

17. A method of installing an automotive electrical wiring harness as claimed in claim 16, said joining step including coupling the connector with said another device having a proximal portion which is substantially the same width as the connector, said sleeve overlapping said proximal portion of said another device when the sleeve is returned onto the connector after said joining step is carried out.

18. A method of installing an automotive electrical wiring harness as claimed in claim 9; and before said placing step, attaching a container to the vehicle in such a manner that a hole in a wall of the container becomes aligned with said opening of the vehicle, said connector being passed through both the hole in the wall of the container and the opening of the vehicle during said inserting step, said wiring harness having a second connector at an opposite end of the harness from the first mentioned connector which may be stored in said container.

* * * * *